United States Patent [19]
Johnston et al.

[11] Patent Number: 5,096,955
[45] Date of Patent: Mar. 17, 1992

[54] STABILIZED POLYETHYLENE RESINS AND METHOD OF STABILIZATION

[75] Inventors: Robert T. Johnston, Lake Jackson; Evelyn J. Slone, Richwood, both of Tex.

[73] Assignee: The Dow Chemical Company, Midland, Mich.

[21] Appl. No.: 641,028

[22] Filed: Jan. 14, 1991

[51] Int. Cl.$^5$ .................................. C08K 5/09
[52] U.S. Cl. .......................................... 524/398
[58] Field of Search .......................... 524/398, 316

[56] References Cited

U.S. PATENT DOCUMENTS 3,310,510  3/1967  Breslow ........................... 524/398
3,464,943  9/1969  Newland .......................... 524/398

FOREIGN PATENT DOCUMENTS 9036147  2/1984  Japan.

Primary Examiner—Kriellion S. Morgan
Assistant Examiner—Tae H. Yoon

[57] ABSTRACT

A novel process is disclosed for stabilizing polyethylene resins having pendant vinyl and/or vinylidene groups against changes in viscosity under melt process conditions. The process comprises adding a viscosity-stabilizing amount of transition metal or transition metal salt to the polyethylene resin prior to or during melt processing operations. The resulting polymer composition are melt-stabilized, crosslink-resistant, substantially gel-free polymer compositions having many uses. The novel compositions are prepared free of metal deactivators.

18 Claims, 2 Drawing Sheets

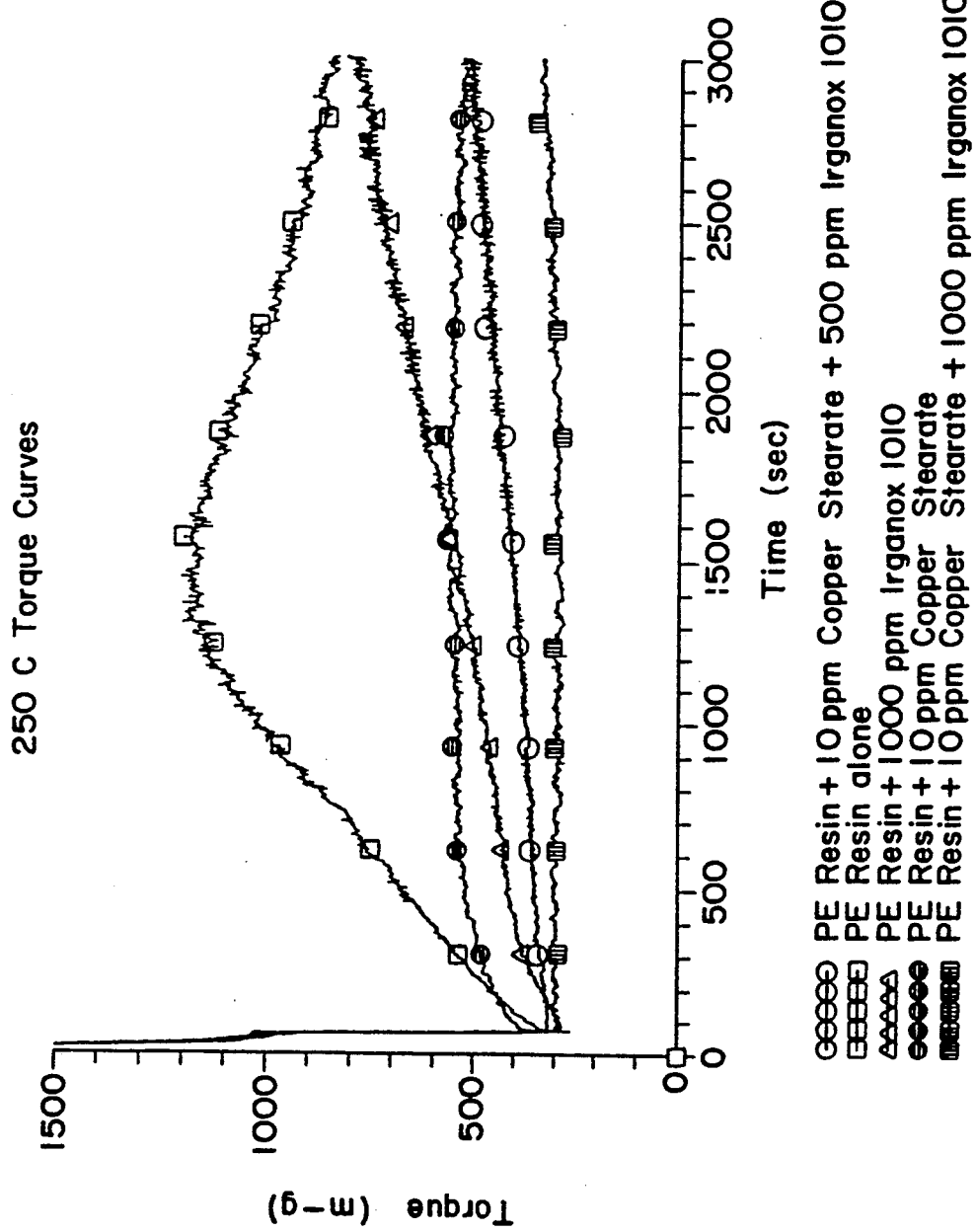

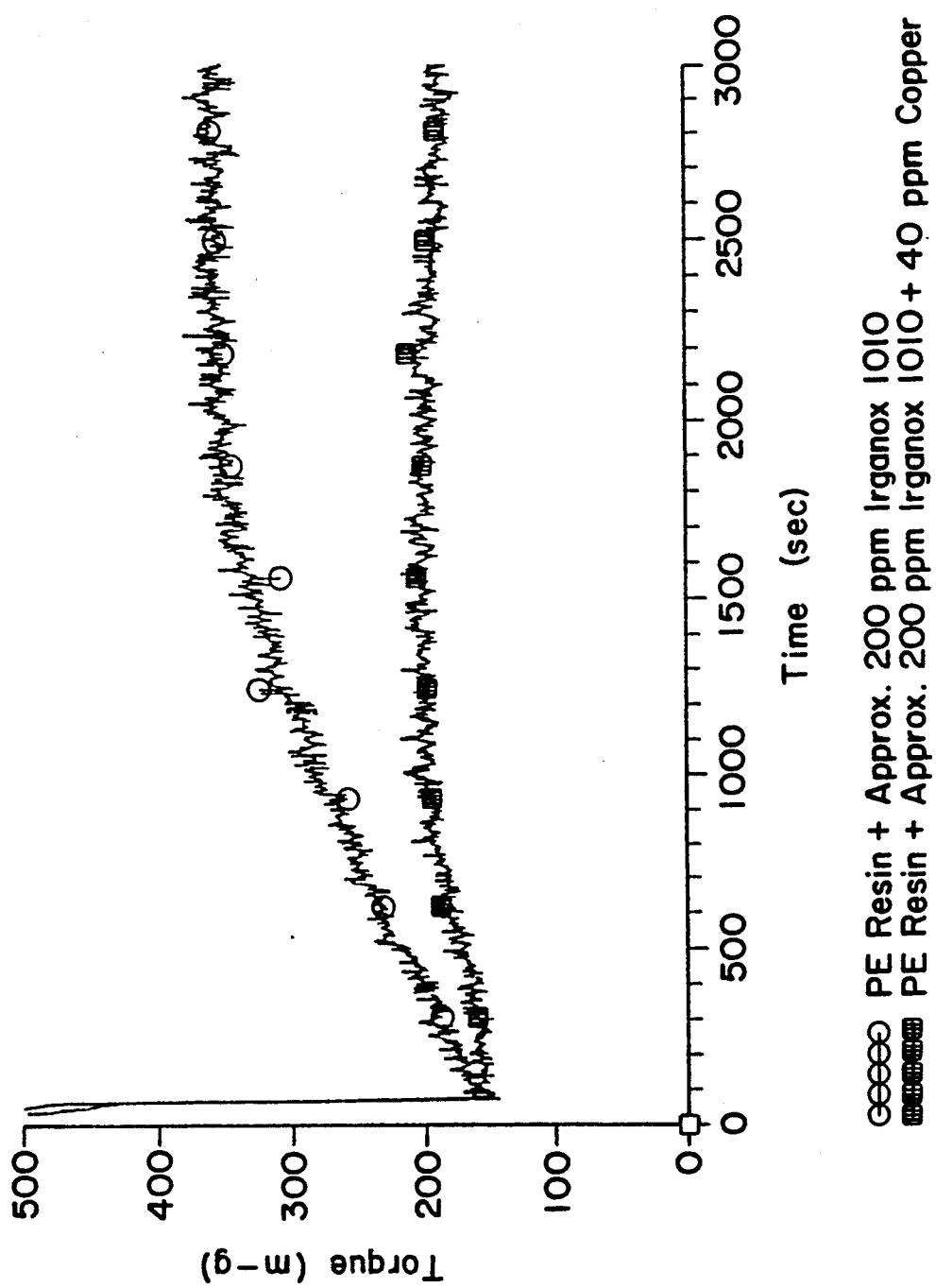

STABILIZED POLYETHYLENE RESINS AND METHOD OF STABILIZATION

BACKGROUND OF THE INVENTION

1. Field of the Invention

This invention pertains to a novel process for stabilizing polyethylene resins having pendant vinyl and/or vinylidene groups against changes in viscosity under melt process conditions. The process comprises adding a viscosity-stabilizing amount of transition metal or transition metal salt to the polyethylene resin prior to or during melt processing operations. The resulting polymer composition is a new melt-stabilized, crosslink-resistant, substantially gel-free polymer composition having many uses. The novel compositions are prepared free of metal deactivators.

2. Technical Background

Polyethylenes are a known class of thermoplastic polymers having many members. They are prepared by homopolymerizing ethylene or interpolymerizing (e.g., copolymerizing) ethylene with one or more alpha-olefins having from 3 to about 18 carbon atoms by known polymerization reactions and conditions. The terms "polyethylenes" and "ethylene polymers" will be used interchangeably herein to refer to such homopolymers and interpolymers (e.g., copolymers, terpolymers) of ethylene. The viscosity of polyethylenes which have pendant vinyl and/or vinylidene groups tends to change during melt process operations. E.g., during extrusion, molding, etc. Such thermally-induced changes in viscosity have been attributed to the changes in molecular weight and/or linearity of the polymers caused by crosslinking.

A wide variety of "stabilizers" have been developed to reduce the changes (e.g., crosslinking) that can occur during melt processing or under conditions of use. Many of the stabilizers are organic compounds which are classified in the plastics industry as antioxidants. Many antioxidants tend to function as free radical scavengers and they interact with free radicals that are formed during polymerization or in the presence of air or other oxidizing medium. Antioxidants are a known class of stabilizers which includes, for example, hindered phenols, triaryl phosphites, aromatic amines, hydroxylamines, and the like. Antioxidants have been added as stabilizers to polyethylenes with mixed success. Typically, such antioxidants have protected polyethylene articles against oxidative degradation at ambient conditions but have not been particularly effective at protecting the polymer against thermally-induced changes in viscosity during melt processing.

The text "Plastic Additives Handbook", Edited by R. Gächter and Müller and distributed in the United States of America by Macmillan Publishing Co., New York, NY (1985) describes Antioxidants in Chapter 1 and the mechanisms by which such compounds are thought to work. It describes polymers that change properties under melt process conditions due to chain scission (e.g., polypropylene) and polymers that change properties due to crosslinking (e.g., low density polyethylene (LDPE)) and suggests that processing stabilizer systems commonly used in polypropylene (i.e., phosphites and a long-term heat stabilizer in overall concentrations up to 0.1%) could be used as process stabilizers for linear low density polyethylene (LLDPE). In Chapter 2, the text confirms the literature in describing the thermo-oxidation of polyolefins as proceeding by a free radical chain mechanism in which hydroperoxides are key intermediates.

Hydroperoxides undergo thermally induced (120° C. and higher) homolytic decomposition to free radicals, which in turn initiate new oxidation chains which attack the polymer and cause degradation. This homolytic decomposition reaction is said to be catalyzed in a redox reaction by the presence of catalytic amounts of certain metal ions, particularly transition metal ions, such as iron, cobalt, manganese, copper and vanadium. The author then states that the presence of such metal ions in the autooxidation of a hydrocarbon increases the decomposition rate of hydroperoxides and the oxidation rate to such an extent that even in the presence of antioxidants, the induction period of oxygen uptake is drastically shortened or completely eliminated. Even at rather high concentrations, hindered phenols or aromatic amines reportedly do not retard the oxidation rate sufficiently. A more efficient inhibition is allegedly achieved by using metal deactivators (e.g., copper inhibitors).

A variety of metal deactivators are described in Chapter 2 in the Gächter et al. handbook and a method of testing is set forth on page 82. In the test, the polyolefin resin and stabilizer are homogenized (i.e., thoroughly blended) in a suitable lab scale kneader (Brabender plastograph), or by milling and adding in the end 1% of a fine copper powder or 0.1% copper stearate, making a compression molded plaque, and then oven aging the plagues to determine polymer changes over time. Test results are commercially important because of the wide use of polyolefin insulation over copper conductors. In such applications the author states that it is mandatory to combine a metal deactivator with an antioxidant if the metal deactivator does not contain moieties with radical scavenging function. Information is presented in Table 1 on page 84 showing combinations of metal deactivators and phenolic type antioxidants used to protect polyethylene in contact with copper. The need for metal deactivators is emphasized by the teaching in "Additives for Plastics" by J. Stepak and H. Daoust, Springer-Verlag New York Inc. (1983) at pages 182–183 that heavy metal ions (Co, Cu, Mn, Fe, Pb) which catalyze the hydroperoxide decomposition are present in polymers from contact with metallic parts of reactors and processing machines.

Attempts have been made to counteract the metal/-metal ion catalyzed peroxide decomposition reaction in polyolefins by including a material in the polymer which reacts preferentially with the peroxide or its decomposition products. Such materials being referred to in this patent application as "sacrificial reducing agents". For example, Black (U.S. Pat. No. 4,122,033) allegedly stabilized organic materials against autooxidation by including at least 100 parts per million (ppm) of a transition metal containing compound and certain (1) aliphatic amines, (2) alkyl selenides, or (3) alkyl phosphines or phosphites.

Similarly, Chiquet (U.S. Pat. No. 4,931,488) included starch in a thermoplastic polymer (e.g., polyethylene) to make a thermoplastic composition which allegedly degrades under the action of heat, ultraviolet light, sunlight and/or composting conditions. Chicquet used iron and another transition metal compound (e.g., copper stearate) to catalyze the degradation of the starch.

In view of these representative teachings about the catalytic effect which transition metals and metal ions have on the thermooxidation of polyolefins (e.g., polyethylenes) and how this catalytic effect is controlled by adding materials which react preferentially with peroxides to "protect" the polymer, it was a surprise to learn that small amounts of a transition metal can thermally stabilize certain polyethylenes under melt process conditions without the "benefit" of metal deactivators.

SUMMARY OF THE INVENTION

A novel process has now been discovered for stabilizing polyethylene resins having pendant vinyl and/or vinylidene groups against changes in viscosity under melt process conditions. The process comprises adding a viscosity-stabilizing amount of transition metal or transition metal salt to the polyethylene resin prior to or during melt processing operations. The resulting polymer composition is a new melt-stabilized, crosslink-resistant, substantially gel-free polymer composition having many uses. The novel compositions are prepared free of metal deactivators.

DETAILED DESCRIPTION OF THE INVENTION

Ethylene polymers having pendant vinyl (—CH=CH$_2$) groups or vinylidene

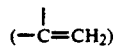

groups are well known. They are olefin polymers which are broadly subclassified as low density polyethylene (LDPE), linear low density polyethylenes (LLDPE) or high density polyethylenes (HDPE). The polymers can be ethylene homopolymers or ethylene interpolymers containing ethylene and minor amounts of one or more alpha-olefins (i.e., alpha-alkenes) in interpolymerized form. Any member of this class of ethylene polymers having pendent vinyl or vinylidene groups can be melt-stabilized according to the present invention, but the invention is particularly useful in melt-stabilizing LLDPE resins. Examples of such ethylene polymers include: ethylene homopolymers: ethylene copolymers, such as copolymers of ethylene with $C_3$-$C_{18}$ alpha-olefins (e.g., propylene, butene-1, hexene-1, octene-1, 4-methylpentene, and the like): ethylene terpolymers, such as ethylene interpolymers having two or more $C_3$-$C_{18}$ alpha-olefins interpolymerized with ethylene (e.g., an ethylene/ propylene/hexene interpolymer).

The ethylene polymers are prepared by known polymerization processes, including: high pressure, free-radical initiated polymerizations to make LDPE and HDPE resins: the "Phillips" process, which uses a chromium catalyst to make HDPE resins: gas phase polymerizations and solution phase polymerizations in which ethylene is copolymerized with an alkene of 3 to about 18 carbon atoms (e.g., butene-1, hexene-1, octene-1) over a suitable transition metal catalyst to make LLDPE: the slurry process for making HDPE: and other known techniques. The polymerization techniques are broadly classified as solution, gas phase or slurry polymerization reactions. The ethylene polymers and methods of preparation are described in many sources. See, for example, the Kirk-Othmer "Encyclopedia of Chemical Technology", Volume 16, pages 385-452: "Modern Plastics Encyclopedia/89", pages 63-72, from McGraw-Hill, Inc.: Chemical Technology Review No. 70 entitled "Polyolefins Production Processes Latest Developments" by Marshall Sittig, Noyes Data Corporation (1976): the compilation of technical papers presented at the Golden Jubilee Conference held June 8-10, 1983, by the Plastics and Rubber Institute under the title "Polyethylenes 1933-83" and the like. The structure of the ethylene polymers can be "branched" or "linear" in molecular configuration and the physical properties (e.g., melt index, density) can be varied by the reaction conditions, catalysts and olefin monomers used in the polymerization.

The metals used in the present invention are transition metals in Groups 5 through 11, Rows 4 through 6 of the CAS Version of the Periodic Chart, "Handbook of Chemistry and Physics", 69th Edition, edited by Robert C. Weast, CRC Press (1989-1990). The metals can be used as finely-divided particulate solids or as metal salts which are dispersible in the ethylene polymers. The metals are preferably used as dispersible metal carboxylate salts and, most preferably as metal carboxylate salts of fatty acids. Vanadium, chromium, manganese, cobalt, copper, molybdenum, ruthenium, palladium and platinum, and dispersible carboxylate salts of such metals are preferred, and copper and copper carboxylate salts are most preferred. Interestingly, iron and nickel (and carboxylate salts thereof) are operable in the present invention, but they are less effective in providing viscosity stabilization than comparable amounts of manganese, cobalt and copper, elements which are adjacent to iron and/or nickel in the periodic chart. Similarly, silver (and its carboxylate salts) did not perform as well as comparable amounts of copper, a metal which is adjacent to silver in the periodic chart. Suitable metals and metal carboxylate salts include, for example, the finely divided metals and the formate, acetate, acetylacetonate, octanoate, neodecanoate, and stearate salts of chromium, manganese, cobalt, copper, and molybdenum, and mixtures there of.

The transition metals or metal carboxylate salts are added to the ethylene polymer in small but viscosity-stabilizing amounts prior to or during melt processing operations. Typically, they are added in amounts of at least about 0.5 parts per million (ppm), which is 0.00005 weight percent, based on the weight of the metal relative to the weight of the ethylene polymer, and amounts up to about 0.1 weight percent or more can be used. By "viscosity-stabilizing" is meant an amount sufficient to reduce the absolute value of the slope of a torque curve (see Example 1 below). The goal is to approach a flat line with a slope of zero, but any reduction in the absolute value of the slope relative to the polyethylene alone is an unexpected improvement and the amount of metal/metal salt added is a viscosity-stabilizing amount.

The metals and metal salts can be added to the ethylene polymers in any convenient manner which results in the metals or metal salts being substantially dispersed in the polymer. Conventional roll mills and sigma mixers can be used for blending the metals or metal salts with the ethylene polymers, or the metal salts can be added to the molten ethylene polymer as it passes through an extruder equipped with mixing means. Another method of dispersing the metal or metal salt into the polymer involves adding the metal compound (dry or in an inert diluent) to a solution of the polymer with sufficient mixing to disperse the metal compound throughout the ethylene polymer. This technique will be particularly useful to manufacturers that use a solution polymerization technique to make the ethylene polymers. The metal or metal salt can also be dissolved or dispersed in an inert solvent and sprayed onto pellets or powders of the ethylene polymer prior to melt processing. Or the metal or metal salts can be dry-blended with pellets or powders of the ethylene polymer prior to melt processing. Other methods will be apparent to those skilled in the art.

In a preferred embodiment, a stabilizer concentrate is prepared which comprises the ethylene polymer and the metal or metal salt dispersed therein: this stabilizer concentrate (generally molten) is then added to the molten ethylene polymer as it passes through an extruder. The stabilizer concentrate is a convenient way of storing and handling the metal or metal salt and it can be easily metered into the extruder in reasonably precise quantities.

Conventional additives, such as pigments, dyes, acid scavengers, lubricants, antioxidants, and the like can also be blended into the ethylene polymer. Conventional antioxidants include hindered phenols, aromatic amines, hydroxylamines and thioesters. The hindered phenols are preferred antioxidants in many ethylene polymer compositions, and the use of such hindered phenols is especially advantageous in combination with the metal compounds set forth above.

"Metal deactivators" which were previously required in the prior art, are not normally included because they react with the metal compounds and render them ineffective as stabilizers. For example, amine salts of ethylenediaminetetraacetic acid (EDTA) and similar materials are metal deactivators and strong metal chelants.

The formulated ethylene polymers (having the metal or metal salt and other additives, if any, dispersed therein) is typically pelletized and used to make film, fibers and molded articles by conventional melt processing techniques. The formulated ethylene polymers, however, have improved properties and advantages over prior art resins because the formulated polymers of the present invention are gel-free or substantially gel-free. Gels are three-dimensional, solvent-insoluble, cross-linked materials which can not be easily removed from the ethylene polymers. Gels produce "fish eyes" and other imperfections in the films, fibers and molded articles made from the resins and adversely affect their physical properties (e.g., film tear strength) or appearance. Gels can also adversely affect the processability of the polymers. For example, polymer gels are the nemesis of fiber manufacturers in melt spinning operations. Accordingly, the formulated ethylene polymers of the present invention and films, fibers and molded articles made there from have improved properties and advantages over prior art polymers.

Experimental

Example 1

An additive-free 1.0 MI, 0.920 g/cc density LLDPE (ethylene 1-octene copolymer) having 0.3 vinyl and 0.1 vinylidene groups was melt processed in a Haake Buchler torque rheometer mixer (Rheomix 600 with roller-style blades and stainless steel or glass-filled TEFLON bushings, attached to a Rheocord System 40 drive unit) at 250° C. and 10 revolutions per minute (rpm) (after a 60 second 60 rpm initial mixing period) under air atmosphere. In the absence of stabilizer, large torque (viscosity) increases were observed until very long processing times, after which torque reductions were observed. The torque increases indicate crosslinking. Addition of 1000 ppm of a phenolic antioxidant {Irganox 1010: CAS #6683-19-8: tetrakis [methylene(3,5-di-tert-butyl-4-hydroxy-hydrocinnamate)] methane) reduced} the rate of torque increase but did not eliminate it. Addition of 10 ppm copper stearate substantially reduced the rate of torque increase but did not eliminate it. However, the combination of 10 ppm copper stearate with 1000 ppm Irganox 1010 produced a nearly flat torque curve indicating that crosslinking was substantially reduced or eliminated during the melt processing procedure.

In the above procedure, a "stabilizer concentrate" was prepared by mixing 2000 ppm copper stearate with an antioxidant-free 1.0 MI, 0.920 g/cc density LLDPE in a low temperature torque rheometer mixer (30 rpm for 15 minutes at 150° C): and (2) mixing the product from step (1) with the Irganox 1010 powder to form the stabilizer concentrate as a dry blend. The stabilized polymer composition was made by adding the stabilizer concentrate and polyethylene pellets to a hot mixer where the materials were melted and mixed by the combined action of heat and the shearing/mixing action of the roller-style mixing blades, as described above.

EXAMPLE 2

Experiments were conducted as in Example 1, except that the polymeric samples were processed for only 1000 seconds and then removed from the mixer and analyzed by Gel Permation Chromotography-Low Angle Laser Light Scattering Detector (GPC-LALLS). This technique allows determination of long-chain branching as well as changes in molecular weight and molecular weight distribution.

The torque curves show that a flatter curve was obtained with 10 ppm copper stearate and 1000 ppm Irganox 1010 than with the unstabilized resin above or containing, 1000 ppm Irganox 1010, or 1000 ppm Irganox 1010 and 1000 ppm Sandostab PEPQ (a complex mixture of isomers which is primarily tetrakis-(2,4-di-tert-butyl-phenyl)-4,4'-biphenylphosphonite: CAS #38613-77-3). The latter composition is a highly effective commercial stabilization system. However, 10 ppm copper stearate and 1000 ppm Irganox 1010 provided even greater stability than the mixture of Irganox 1010 and PEP.

GPC-LALLS results show no significant change in molecular weight distribution for the LLDPE stabilized with copper stearate/Irganox 1010 compared to the other three compositions. A graph of molecular weight vs. elution volume shows the absence of any significant degree of longchain branch formation due to crosslinking in the copper stearate/Irganox 1010 mixture, whereas the base resin or the Irganox 1010 stabilized system show higher molecular weights for a given elution volume compared to the original unprocessed pellets, indicating the formation of longchain branching.

EXAMPLE 3

An ethylene/octene copolymer having 0.2 vinyl groups and 0.03 vinylidene groups was produced in a Ziegler-catalyzed solution process reactor: the copolymer was continuously discharged from the reactor as an approximately 10% polymer solution in an aliphatic hydrocarbon solvent. A mixture of Irganox 1010, calcium stearate and copper stearate slurried in the same hydrocarbon solvent was injected at approximately 15 lb/hr into the polymer solution as it was continuously discharged. The flow rate of the additive stream was calculated to achieve a final concentration in the polymer of approximately 1250 ppm calcium stearate, 200 ppm Irganox 1010 and 40 ppm copper stearate. The temperature of the solution was approximately 180° C. The two streams were mixed by Koch static mixer. This mixture of polymer and additives in hydrocarbon solvent was passed through a heat exchanger and then devolatilized using two-stage vacuum devolatilization, pumped with a gear pump through an underwater pelletizer and converted into solid pellets of polymer with additives dispersed within. The production rate of the solid polymer was 160 lb/hr. The final polymer was characterized as follows: melt flow index (ASTM D1238 Cond. E) was 2.4±0.2 g/10 minutes, the high shear melt flow index (ASTM D1238 Cond. N) was 34±2 g/10 minutes, and the density was 0.945±0.005 g/cm3 (ASTM D792).

Vinyl and vinylidene measurement procedure:

Approximately 0.5 mm thick films of polymer were compression molded between Mylar sheets at approximately 27°-350° F. for approximately 1 minute at between 5,000 and 40,000 psi hydraulic pressure. These films were analyzed in a Beckman Model 4240 Infrared Spectrophotometer (this is a double beam dispersive instrument). A 55%, transmittance wire mesh screen was placed in the reference beam. The film sample was placed in the sample beam. With a slit width of 2.5 mm and a period of 2 seconds, the transmittance was set to 90 percent at 850 cm$^{-1}$, the single beam/double beam ratio set to 1 at 850 cm$^{-1}$, and the sample was scanned from 850 to 1000 cm$^{-1}$ at a scan rate between 80 and 300 cm$^{-1}$/minute. The absorbances at 909 (vinyl) and 888 (vinylidene) cm$^{-1}$ were determined from the spectral scan, measuring the absorbances from a baseline drawn between approximately 850 and 940 cm$^{-1}$ and the peaks at 909 and 888 cm$^{-1}$. The vinyl concentration was calculated using the following equation:

$$\text{Vinyls/1000 carbons} = \frac{\text{Absorbance at 909 cm}^{-1}}{L \times K}$$

where L is the sample thickness in millimeters as measured by a micrometer, and K=0.97.

The film samples were subsequently brominated by exposing them to bromine vapor in a glass jar for six hours at room temperature (ASTM D3124). The brominated films were washed in water, then dried. These films were rescanned in the infrared spectrophotometer using the procedure described above. The absorbance at 888 cm$^{-1}$ was measured and subtracted from the absorbance at 888 cm$^{-1}$ determined above to obtain a corrected absorbance. (The correction is necessary to obtain the true vinylidene concentration since there is an unrelated peak at approximately 895 cm$^{-1}$ which contributes to the absorbance at 888 cm$^{-1}$). The vinylidene concentration was then calculated using the following equation:

$$\text{Vinylidenes/1000 carbons} = \frac{\text{Corrected Absorbance at 888 cm}^{-1}}{L \times K}$$

where L is the average film thickness as measured above and K=0.786.

What is claimed is:

1. A process for stabilizing a polyethylene resin having pendant vinyl and/or vinylidene groups against changes in viscosity under melt procesing conditions, said process comprising adding a viscosity-stabilizing amount of transition metal or transition metal salt to said polyethylene resin prior to or during melt processing operations, provided that said transition metal or transition metal salt is not nickel or a nickel salt.

2. The process defined by claim 1 wherein said transition metal and/or transition metal salt is added to the resin prior to melt processing.

3. The process defined by claim 1 wherein said transition metal and/or transition metal salt is added to the resin during melt processing.

4. A melt-stabilized, crosslink-resistant, substantially gel-free polymeric composition comprising (a) a polyethylene resin having pendant vinyl and/or vinylidene groups, and (b) a transition metal or transition metal salt dispersed in said polyethylene resin in an amount sufficient to stabilize the viscosity of said polyethylene resin at melt process conditions: said composition being free of metal deactivators.

5. The composition defined by claim 4 which additionally comprises a compatible antioxidant.

6. The composition defined by claim 5 wherein said antioxidant is a phenolic antioxidant.

7. The composition defined by claim 4 wherein (b) is copper and/or a copper carboxylate salt.

8. The composition defined by claim 7 wherein (b) is a copper salt of a fatty acid.

9. The composition defined by claim 8 wherein (b) is copper stearate.

10. The composition defined by claim 4 wherein (a) is a LDPE, LLDPE or HDPE having at least about 0.05 vinyl and/or vinylidene group per 1000 carbon atoms in the polymer.

11. The process defined by claim 1 wherein said transition metal or transition metal salt is vanadium, chromium, manganese, cobalt, copper, molybdenum, ruthenium, palladium, platinum, or a dispersible carboxylate salt there of.

12. The process defined by claim 11 wherein said carboxylate salt is a carboxylate salt of a fatty acid.

13. The process defined by claim 11 wherein said transition metal or transition metal salt is copper or a copper carboxylate.

14. The process defined by claim 13 wherein said transition metal or transition metal salt is copper stearate.

15. The process defined by claim 1 wherien said transition metal or transition metal salt is added to said polyethylene resin in an amount of from about 0.00005 to about 0.1 weight percent, based on the weight of the metal relative to the weight of the polyethylene resin.

16. The process defined by claim 11 wherein said transition metal or transition metal salt is added to the polyethylene resin in an amount of from about 0.00005 to about 0.1 weight percent, based on the weight of the metal relative to the weight of the polyethylene resin.

17. The process defined by claim 3 wherein said transition metal and/or transition metal salt is added to the polyethylene resin in the form of a stabilizer concentrate.

18. The composition defined by claim 4 wherein (b) is vanadium, chromium, manganese, cobalt, copper, molybdenum, ruthenium, palladium, platinum, or a dispersible carboxylate salt thereof.

* * * * *